(12) United States Patent
Hoffman

(10) Patent No.: US 8,257,216 B2
(45) Date of Patent: Sep. 4, 2012

(54) INFINITELY VARIABLE TRANSMISSION

(75) Inventor: Donald Edward Hoffman, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 302 days.

(21) Appl. No.: 12/687,254

(22) Filed: Jan. 14, 2010

(65) Prior Publication Data

US 2011/0172051 A1    Jul. 14, 2011

(51) Int. Cl.
*F16H 37/02* (2006.01)
(52) U.S. Cl. .......................... 475/207; 475/215
(58) Field of Classification Search .................. 475/207, 475/214–217, 330, 343; 74/721
See application file for complete search history.

(56) References Cited

U.S. PATENT DOCUMENTS

| | | |
|---|---|---|
| 4,590,561 A | 5/1986 | Abo et al. |
| 5,074,830 A * | 12/1991 | Perry ............................ 475/216 |
| 5,157,993 A | 10/1992 | Abo |
| 5,217,418 A | 6/1993 | Fellows et al. |
| 5,309,778 A * | 5/1994 | Antonov ...................... 74/15.86 |
| 5,401,221 A * | 3/1995 | Fellows et al. ................ 475/214 |
| 5,564,998 A | 10/1996 | Fellows |
| 5,586,953 A | 12/1996 | Abo |
| 5,667,456 A | 9/1997 | Fellows |
| 5,967,931 A | 10/1999 | Hoge et al. |
| 6,006,619 A * | 12/1999 | Gindentuller et al. ........... 74/44 |
| 6,045,477 A | 4/2000 | Schmidt |
| 6,244,368 B1 | 6/2001 | Ando et al. |
| 6,723,016 B2 | 4/2004 | Sumi |
| 6,979,275 B2 | 12/2005 | Hiraku et al. |
| 7,347,801 B2 * | 3/2008 | Guenter et al. ............... 475/216 |
| 2007/0270278 A1 | 11/2007 | Miller et al. |

* cited by examiner

*Primary Examiner* — Justin Holmes
(74) *Attorney, Agent, or Firm* — David B. Kelley; Brooks Kushman, P.C.

(57) ABSTRACT

An infinitely variable power transmission comprising an input shaft, a layshaft driven by the input shaft via internal/external gearing, a toroidal variator, and gearing and clutches which implement a low/reverse variable ratio mode and a high range variable ratio mode. An additional clutch and gearing implement an optional fixed ratio mode.

18 Claims, 4 Drawing Sheets

| Gear / Sprocket Number | Number of teeth |
|---|---|
| 18 | 138 |
| 20 / 70 | 50 |
| 22 / 72 | 25 |
| 24 | 88 |
| 60 | 50 |
| 62 | 78 |
| 38 | 44 |
| 40 | 78 |
| 44 | 17 |
| 48 | 50 |
| 50 | 99 |
| 54 | 25 |

Fig. 2

| Mode | Speeds Relative to Input Shaft 10 | | | | | | |
|---|---|---|---|---|---|---|---|
| | Layshaft 16/68 | Variator Input 26 | Variator Output 28/30 | Intermediate Shaft 46 | Ring Gear 50 | Driven Sprocket 62 | Output Shaft 12 |
| Low Variable (Max Reverse) | 2.760 | -0.784 | 1.734 | 0.361 | -0.333 | 1.769 | -0.333 |
| Low Variable (Geared Neutral) | 2.760 | -0.784 | 1.075 | 0.361 | 0 | 1.769 | 0 |
| Low Variable (Shift Point) | 2.760 | -0.784 | 0.361 | 0.361 | 0.361 | 1.769 | 0.361 |
| High Variable (Shift Point) | 2.760 | -0.784 | 0.361 | 0.361 | 0.361 | 1.769 | 0.361 |
| High Variable (Max Forward) | 2.760 | -0.784 | 1.734 | 0.361 | -0.333 | 1.769 | 1.734 |
| Fixed Ratio | 2.760 | -0.784 | 1.734 | 0.361 | -0.333 | 1.769 | 1.769 |

Fig. 3

| Mode | Clutch 56 | Clutch 58 | Clutch 66 |
|---|---|---|---|
| Low Variable | X | | |
| High Variable | | X | |
| Fixed Ratio | | | X |

Fig. 4

INFINITELY VARIABLE TRANSMISSION

FIELD OF THE INVENTION

This invention relates to the field of automatic transmissions for motor vehicles. More particularly, the invention pertains to transmissions which provide a continuous range of speed ratios, including zero, between the output speed and the input speed.

BRIEF DESCRIPTION OF THE DRAWINGS

FIG. 2 is a table showing the proposed tooth numbers for the gears and sprockets of the transmission illustrated in FIG. 1.

FIG. 3 is a table showing the speeds of various elements in various operating conditions when the gears and sprockets have the tooth numbers shown in FIG. 2.

FIG. 4 is a table showing the state of the clutches for each operating mode.

DETAILED DESCRIPTION OF THE INVENTION

Figure 1:
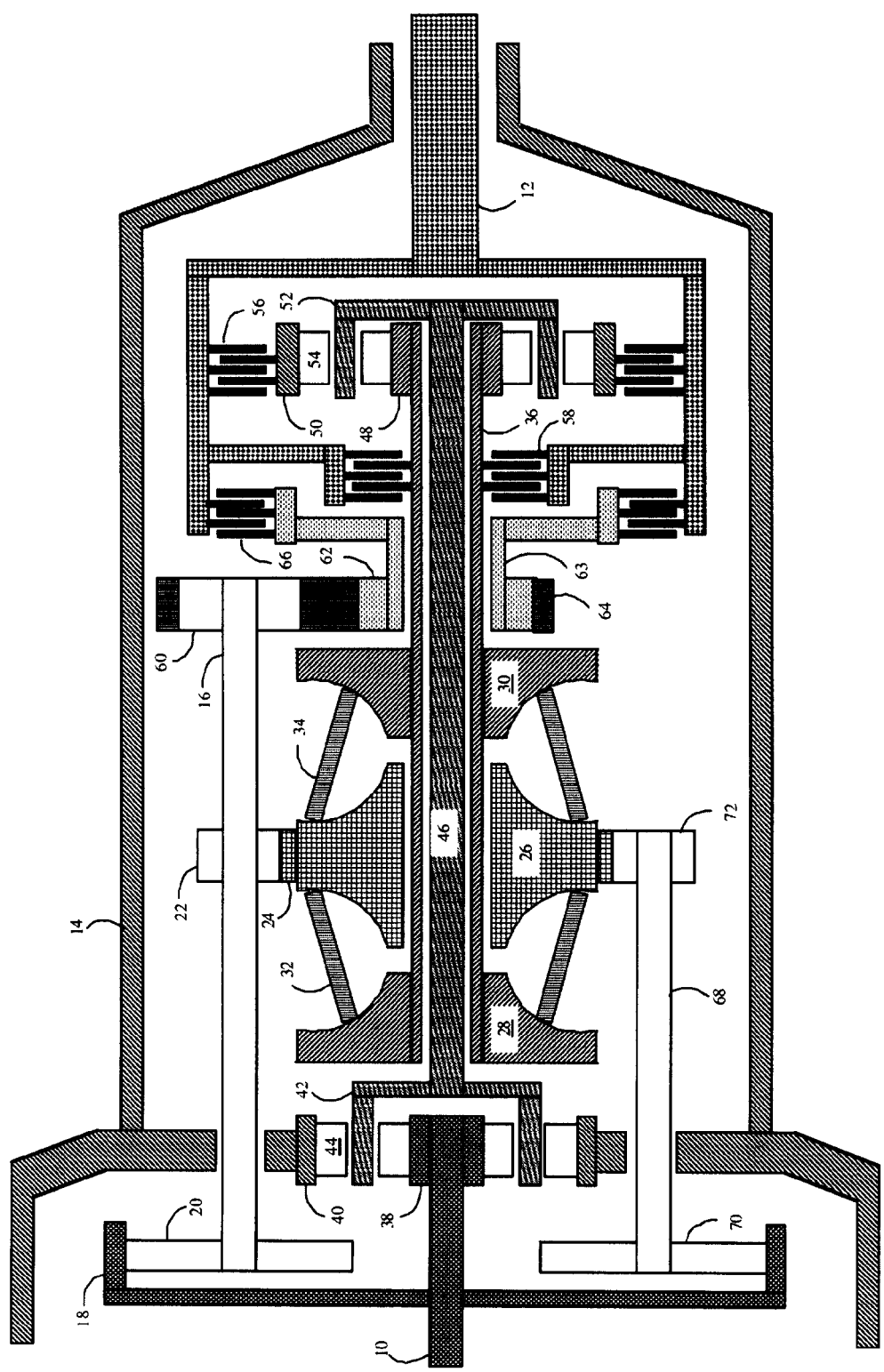
FIG. 1 is a schematic diagram of a transmission according to the present invention.

A transmission according to the present invention is illustrated schematically in FIG. 1. Input shaft 10 is driven by the vehicle engine, preferably via a torsional isolator that smoothes out torque fluctuations due to discrete cylinder firings. Output shaft 12 drives the vehicle wheels, preferably via a differential.

A dual cavity toroidal variator transfers power from variator input disk 26 to variator output disks 28 and 30, which are both fixed to intermediate shaft 36. The variator is capable of efficiently transferring power at any speed ratio within its ratio range. In the present embodiment, the ratio range of the variator includes 2.211:1 overdrive and 0.463:1 underdrive. Two sets of power rollers 32 and 34 transfer power between the input disk and the output disks. The output disks always rotate in the opposite direction of the input disk. The axes about which the power rollers rotate is tilted to control the speed ratio of the variator. In the condition shown in FIG. 1, the radius of the interface between the power roller and the input disk is greater than the radius of the interface between the power rollers and the output disks, causing the output disks to rotate at a faster speed than the input disk. When the power roller axes are tilted in the opposite direction, the output disks rotate slower than the input disk.

Two varieties of toroidal variator are well known: full-toroidal and half-toroidal. In a full-toroidal variator, the cavity between an input disk and an output disk is shaped like a torus. In a half-toroidal, as illustrated in FIG. 1, only the inner portion of the torus is used. The present invention is applicable with either variety of toroidal variator.

Power is transmitted from the input shaft to the variator input disk by means of at least one layshaft 16. Layshaft 16 is driven by the input shaft through internal gear 18 which meshes with external gear 20. Internal/external gear meshes are more efficient than external/external gear meshes. Internal gear 18 must have a relatively large diameter, but this is acceptable because it is located in the bell housing portion of transmission case 14. Layshaft 16 drives variator input disk 26 through external gears 22 and 24. A second layshaft 68, with external gears 70 and 72, causes the separating forces of the gear meshes driving the variator input disk to partially or completely counteract one another, reducing the side loads on the variator input disk and simplifying the necessary support bearings.

A front planetary gear set drives intermediate shaft 46 at a predetermined proportion of the input shaft speed. Sun gear 38 is fixed to input shaft 10. Ring gear 40 is fixed to transmission case 14. Planet carrier 42 is fixed to intermediate shaft 46. A set of planet gears 44 is supported on planet carrier 42 and meshes with both sun gear 38 and ring gear 42.

A rear planetary gear set combines the speeds of intermediate shaft 46 and intermediate shaft 36. Sun gear 48 is fixed to intermediate shaft 36. Planet carrier 52 is fixed to intermediate shaft 46. A set of planet gears 54 is supported on planet carrier 52 and meshes with both sun gear 48 and ring gear 50. The number of teeth on the various gears are selected such that ring gear 50 is stationary for some variator speed ratio within the variator's available ratio range. This variator speed ratio is called the geared neutral ratio. An example of suitable tooth numbers is provided in FIG. 2. When the variator ratio is set to a more underdrive ratio than the geared neutral ratio, ring gear 50 rotates in the same direction as the input shaft. Conversely, when the variator ratio is set to a more overdrive ratio than the geared neutral ratio, ring gear 50 rotates in the opposite direction as the input shaft.

Clutch 56 releasably connects ring gear 50 to output shaft 12. Clutch 56 completes a power path that is suitable for reverse motion and low speed forward motion. Substantially the same result would be obtained by placing clutch 56 is other locations within this power path. For example, ring gear 50 could be fixed to output shaft 12 with clutch 56 replacing one of the other fixed connections, such as between input shaft 10 and sun gear 38, between transmission case 14 and ring gear 40, between planet carrier 42 and planet carrier 52, or between intermediate shaft 36 and sun gear 48. These alternative arrangements would result in different relative speeds when clutch 56 is disengaged, but identical behavior when clutch 56 is engaged. Clutch 58 releasably connects intermediate shaft 36 to output shaft 12. Clutch 58 is applied for moderate to high speed forward motion. The number of teeth on the various gears are selected such that ring gear 50 and intermediate shaft 36 rotate at the same speed at a variator ratio that is close to the maximum underdrive variator ratio.

Intermediate shaft 63 is constrained to rotate at a speed proportional to layshaft 16 and in the same direction. Chain 64 meshes with sprocket 60, which is fixed to layshaft 16, and with sprocket 62, which is fixed to intermediate shaft 63. Clutch 66 releasably connects intermediate shaft 63 to output 12. These elements form a fixed ratio power path suitable for highway cruising because it bypasses the variator and therefore has better mechanical efficiency. The number of teeth on the various gears and sprockets are selected such that intermediate shaft 63 and intermediate shaft 36 rotate at the same speed at a variator ratio that is close to the maximum overdrive variator ratio.

Clutches 56, 58, and 66 are preferably hydraulically actuated friction clutches which transmit torque when hydraulic pressure is applied and permit relative motion with low drag torque when the hydraulic pressure is removed. However, since the speeds of the elements may be synchronized before engaging the oncoming clutch, other types of couplers, such as dog clutches or switchable one way clutches, may be substituted for some or all of these clutches.

The vehicle is prepared for launch in reverse by disengaging all clutches and setting the variator ratio slightly on the overdrive side of the geared neutral ratio such that ring gear 50 rotates slowly backwards. In response to driver demand, clutch 56 is gradually engaged, accelerating the vehicle in reverse. The launch is completed when the speed of the output shaft reaches the same speed as ring gear 50 and clutch 56 is completely engaged. As the vehicle accelerates further, the variator ratio is adjusted to obtain a target engine speed selected based on driving conditions.

Similarly, the vehicle is prepared for launch in forward by disengaging all clutches and setting the variator ratio slightly on the underdrive side of the geared neutral ratio such that ring gear 50 rotates slowly forwards. In response to driver demand, clutch 56 is gradually engaged. The launch is completed when clutch 56 is completely engaged. As the vehicle accelerates further, the variator ratio is adjusted to obtain a target engine speed.

As the vehicle continues to accelerate, a point will be reached where the variator ratio is near its underdrive limit. At this point, the transmission is shifted from low mode to high mode by releasing clutch 56 while engaging clutch 58. Unlike a gear change in a traditional step ratio transmission, this transition does not involve a change in the speed ratio between the output shaft and the input shaft. Once the transition to high mode is complete, the controller resumes adjusting variator ratio to obtain a target engine speed.

Typically, fixed ratio gearing provides better mechanical efficiency than power paths that include a variator. As a result, it may be preferable to shift to the fixed ratio mode when the vehicle is cruising at a moderately high speed. The transmission is shifted from high mode to fixed ratio mode by releasing clutch 58 while engaging clutch 66. As shown in FIG. 3, the tooth numbers shown in FIG. 2 result in a fixed ratio mode that is slightly more overdrive than the most overdrive ratio in high mode. As a result, this shift is an upshift with a very small ratio change. However, different speed ratios of the fixed ratio mode, either higher or lower, may be selected by adjusting the number of teeth on sprockets 60 and 62 without departing from the inventive concept.

A shift from fixed ratio mode back to high mode is accomplished by releasing clutch 66 while engaging clutch 58. Preferably, the shift should be accomplished with the variator ratio set to minimize the overall ratio change. Similarly, a shift from high mode back to low mode is accomplished by releasing clutch 58 and engaging clutch 56.

In accordance with the provisions of the patent statutes, the structure and operation of the preferred embodiment has been described. However, it should be noted that alternate embodiments can be practiced otherwise than as specifically illustrated and described.

What is claimed is:

1. A power transmission, comprising:
an input shaft;
a first layshaft;
an internal gear fixed for rotation with the input shaft;
a first external gear fixed for rotation with the first layshaft and in continuous meshing engagement with the internal gear;
a variator input disk;
a second external gear fixed for rotation with the first layshaft;
a third external gear fixed for rotation with the variator input disk and in continuous meshing engagement with the second external gear;
a first variator output disk; and
a first set of rollers in frictional contact with the variator input disk and the first variator output disk.

2. The power transmission of claim 1, further comprising a first intermediate shaft fixed for rotation with the first variator output disk;
a second variator output disk fixed for rotation with the first intermediate shaft; and
a second set of rollers in frictional contact with the variator input disk and the second variator output disk.

3. The power transmission of claim 2, further comprising an output shaft; and
a first coupler releasably constraining the first intermediate shaft to rotate at the same speed as the output shaft.

4. The power transmission of claim 3, further comprising a second intermediate shaft;
a second coupler; and
gearing connecting the input shaft, first intermediate shaft, second intermediate shaft, output shaft, and second coupler such that, whenever the second coupler is engaged
the speed of the second intermediate shaft is constrained to rotate at a speed proportional to the speed of the input shaft; and
the speed of the second intermediate shaft is a linear combination of the speed of the first intermediate shaft and the speed of the output shaft.

5. The power transmission of claim 3, further comprising a second intermediate shaft;
a first sun gear;
a first ring gear;
a first planet carrier;
a first set of planet gears supported on the first planet carrier and meshing with both the first sun gear and first ring gear;
a second sun gear;
a second ring gear;
a second planet carrier;
a second set of planet gears supported on the second planet carrier and meshing with both the second sun gear and second ring gear; and
a second coupler arranged such that, whenever the second coupler is engaged
the input shaft is drivably connected to the first sun gear;
the first ring gear is held against rotation; and
the second intermediate shaft is drivably connected to the first planet carrier;
the first intermediate shaft is drivably connected to the second sun gear;
the output shaft is driveably connected to the second ring gear; and
the second intermediate shaft is drivably connected to the second planet carrier.

6. The power transmission of claim 5, wherein
the input shaft is fixed for rotation with the first sun gear;
the first ring gear is continuously held against rotation;
the second intermediate shaft is fixed for rotation with the first planet carrier and the second planet carrier;
the first intermediate shaft is fixed for rotation with the second sun gear; and
the second coupler releasably connects the output shaft to the second ring gear.

7. The power transmission of claim 3, further comprising a third coupler; and
gearing connecting the first layshaft, output shaft, and third coupler such that the output shaft is constrained to rotate at a speed proportional to the speed of the input shaft whenever the third coupler is engaged.

8. The power transmission of claim 7, wherein the output shaft rotates at a speed faster than the input shaft whenever the third coupler is engaged.

9. The power transmission of claim 7, wherein the gearing connecting the first layshaft, output shaft, and third coupler comprises a first sprocket fixed for rotation with the first layshaft;
a third intermediate shaft;
a second sprocket fixed for rotation with the third intermediate shaft; and
a chain in continuous meshing contact with both the first sprocket and second sprocket.

10. The power transmission of claim 1, further comprising
a second layshaft;
a fourth external gear fixed for rotation with the second layshaft and in continuous meshing engagement with the internal gear; and
a fifth external gear fixed for rotation with the second layshaft and in continuous meshing engagement with the third external gear.

11. A power transmission, comprising:
an input shaft;
a variator input disk;
gearing constraining the variator input disk to rotate at a speed proportional to the speed of the input shaft and in the opposite direction;
a first variator output disk;
a first set of rollers in frictional contact with the variator input disk and the first variator output disk;
a first sun gear fixed for rotation with the input shaft;
a first ring gear continuously held against rotation;
a first planet carrier; and
a first set of planet gears supported on the first planet carrier and meshing with both the first sun gear and first ring gear.

12. The power transmission of claim 11, further comprising
a first intermediate shaft fixed for rotation with the first variator output disk;
a second variator output disk fixed for rotation with the first intermediate shaft; and
a second set of rollers in frictional contact with the variator input disk and the second variator output disk.

13. The power transmission of claim 12, further comprising
an output shaft;
a second intermediate shaft fixed for rotation with the first planet carrier;
a second sun gear;
a second ring gear;
a second planet carrier;
a second set of planet gears supported on the second planet carrier and meshing with both the second sun gear and second ring gear; and
a first coupler arranged such that, whenever the first coupler is engaged
the first intermediate shaft is drivably connected to the second sun gear;
the output shaft is driveably connected to the second ring gear; and
the second intermediate shaft is drivably connected to the second planet carrier.

14. The power transmission of claim 13, wherein
the first intermediate shaft is fixed for rotation with the second sun gear;
the second intermediate shaft is fixed for rotation with the second planet carrier; and
the first coupler releasably connects the output shaft to the second ring gear.

15. The power transmission of claim 13, further comprising a second coupler releasably constraining the first intermediate shaft and the output shaft to rotate at the same speed.

16. The power transmission of claim 12, further comprising
a layshaft;
an internal gear fixed for rotation with the input shaft;
a first external gear fixed for rotation with the layshaft and in continuous meshing engagement with the internal gear;
a second external gear fixed for rotation with the layshaft; and
a third external gear fixed for rotation with the variator input disk and in continuous meshing engagement with the second external gear.

17. The power transmission of claim 13, further comprising
a third coupler; and
gearing connecting the input shaft, output shaft, and third coupler such that the output shaft is constrained to rotate at a speed proportional to the speed of the input shaft whenever the third coupler is engaged.

18. The power transmission of claim 17, wherein the output shaft rotates at a speed faster than the input shaft whenever the third coupler is engaged.

* * * * *